United States Patent
Niitsuma

(10) Patent No.: US 10,802,561 B2
(45) Date of Patent: Oct. 13, 2020

(54) INFORMATION PROCESSING APPARATUS

(71) Applicant: CANON KABUSHIKI KAISHA, Tokyo (JP)

(72) Inventor: Hiroaki Niitsuma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 16/124,718

(22) Filed: Sep. 7, 2018

(65) Prior Publication Data
US 2019/0094934 A1    Mar. 28, 2019

(30) Foreign Application Priority Data
Sep. 26, 2017   (JP) .................. 2017-185318

(51) Int. Cl.
| | | |
|---|---|---|
| *G06F 1/00* | (2006.01) | |
| *G06F 1/26* | (2006.01) | |
| *G06F 1/10* | (2006.01) | |
| *G06F 1/24* | (2006.01) | |

(52) U.S. Cl.
CPC ............... *G06F 1/266* (2013.01); *G06F 1/10* (2013.01); *G06F 1/24* (2013.01)

(58) Field of Classification Search
CPC ............... G06F 1/266; G06F 1/24; G06F 1/10
See application file for complete search history.

(56) References Cited

U.S. PATENT DOCUMENTS

| 8,729,934 B2 | 5/2014 | Osada | |
|---|---|---|---|
| 10,235,185 B2 * | 3/2019 | Han | .................. G06F 1/24 |

FOREIGN PATENT DOCUMENTS

JP        2013-77939        4/2013

OTHER PUBLICATIONS

U.S. Appl. No. 16/150,826, filed Oct. 3, 2018 by Hiroaki Niitsuma.

* cited by examiner

*Primary Examiner* — Xuxing Chen
(74) *Attorney, Agent, or Firm* — Venable LLP

(57) ABSTRACT

An information processing apparatus includes a first circuit configured to operate by receiving a first voltage or a second voltage higher than the first voltage; a second circuit configured to output a signal indicating which of the first voltage or the second voltage is to be input to the first circuit; and a control unit configured to receive the signal output by the second circuit and to output, to the first circuit, a signal indicating a voltage to be supplied to the first circuit. The control unit is configured to output a signal indicating the second voltage for a period until when the signal output by the second circuit has stabilized, and to output a signal indicating a voltage as indicated by the signal received from the second circuit, after the signal output by the second circuit has stabilized.

15 Claims, 6 Drawing Sheets

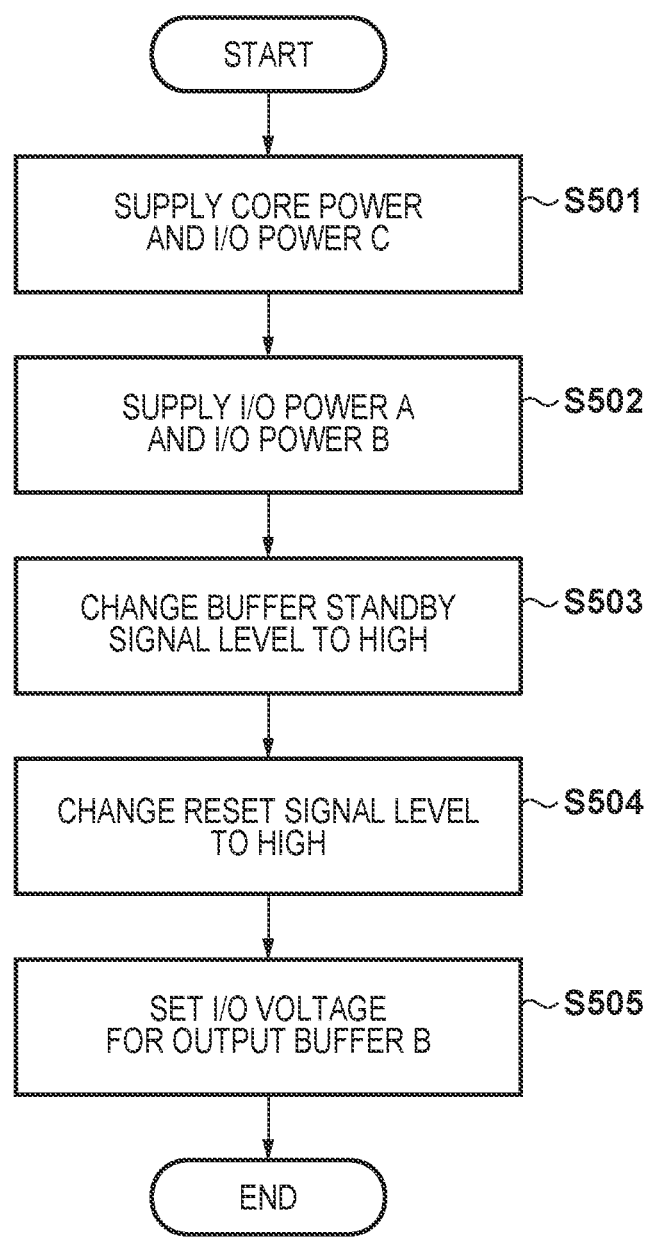

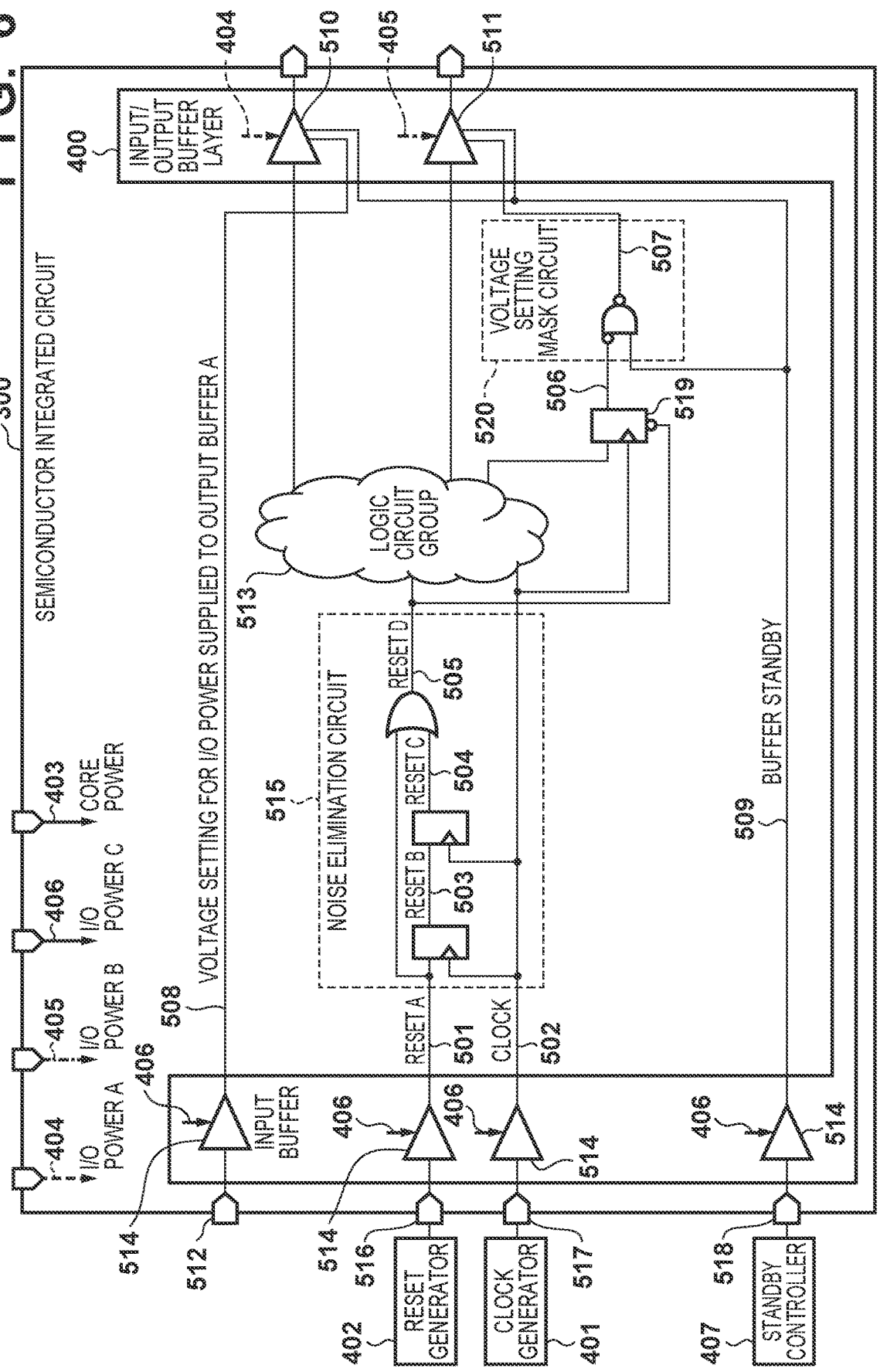

INFORMATION PROCESSING APPARATUS

BACKGROUND OF THE INVENTION

Field of the Invention

The present invention relates to an information processing apparatus which includes a buffer circuit which can operate at more than one drive voltage.

Description of the Related Art

PCs (Personal Computers), information processing apparatuses such as embedded equipment, and image forming apparatuses such as MFPs (Multi Function Printers) employ semiconductor integrated circuits. A semiconductor integrated circuit employed in such equipment has one or more digital logic circuits each of which is reset by a reset signal externally supplied to the semiconductor integrated circuit. When the equipment is powered on, the semiconductor integrated circuit having this configuration can reset the internal digital logic circuits and can start to operate normally. While the equipment is in operation, however, if some kind of noise is applied to the reset signal externally supplied to the semiconductor integrated circuit, the semiconductor integrated circuit may be reset unexpectedly. To avoid such a possibility, a noise elimination circuit is provided at a reset signal input part, so that the semiconductor integrated circuit can have higher noise immunity and cannot be easily reset by application of noise.

On the other hand, use of the noise elimination circuit causes another concern in that when the equipment is powered on, the digital logic circuits in the semiconductor integrated circuit are not reset immediately, and logical value outputs from the digital logic circuits are indeterminate between High (1) and Low (0) for a certain period after power-on. If an output of any digital logic circuit connected to an input/output buffer is indeterminate, an incorrect output is sent to one or more other devices connected to the semiconductor integrated circuit in the equipment, which may cause erroneous operation of the equipment. As a preventive measure, Japanese Patent No. 5501320 discloses a configuration for preventing an incorrect output in a semiconductor integrated circuit during a reset period immediately after the equipment is powered on, by fixing the output value of an input/output buffer at a predetermined value during the reset period.

Japanese Patent No. 5501320 discloses a configuration for preventing an incorrect output to one or more other devices connected to the semiconductor integrated circuit during the reset period immediately after the equipment is powered on. For example, there is a type of input/output buffer for a semiconductor integrated circuit that operates in accordance with the level of supplied voltage, by selecting a voltage setting for a supplied I/O power from more than one setting and supplying the I/O power according to the selected voltage setting. If the voltage setting for the I/O power is indeterminate, the withstand voltage at the input/output buffer may be set lower than the voltage level of the I/O power supplied to the semiconductor integrated circuit, in which case the input/output buffer receives a load over its withstand voltage.

SUMMARY OF THE INVENTION

An aspect of the present invention is to eliminate the above-mentioned problems with the conventional technology. The present invention provides an information processing apparatus which prevent a situation where the voltage setting for the buffer circuit is indeterminate.

The present invention in one aspect provides an information processing apparatus comprising: a first circuit configured to operate by receiving a first voltage or a second voltage higher than the first voltage; a second circuit configured to output a signal indicating which of the first voltage or the second voltage is to be supplied to the first circuit; and a control unit configured to receive the signal output by the second circuit and to output, to the first circuit, a signal indicating a voltage to be supplied to the first circuit, wherein the control unit is configured to output a signal indicating the second voltage for a period until when the signal output by the second circuit has stabilized, and to output a signal indicating a voltage as indicated by the signal received from the second circuit, after the signal output by the second circuit has stabilized.

The present invention can prevent a situation where the voltage setting for the buffer circuit is indeterminate.

Further features of the present invention will become apparent from the following description of exemplary embodiments with reference to the attached drawings.

BRIEF DESCRIPTION OF THE DRAWINGS

FIG. 5 is a flowchart showing an operation sequence when the semiconductor integrated circuit is powered on.

FIG. 6 shows another circuit configuration in the semiconductor integrated circuit.

DESCRIPTION OF THE EMBODIMENTS

Figure 1:
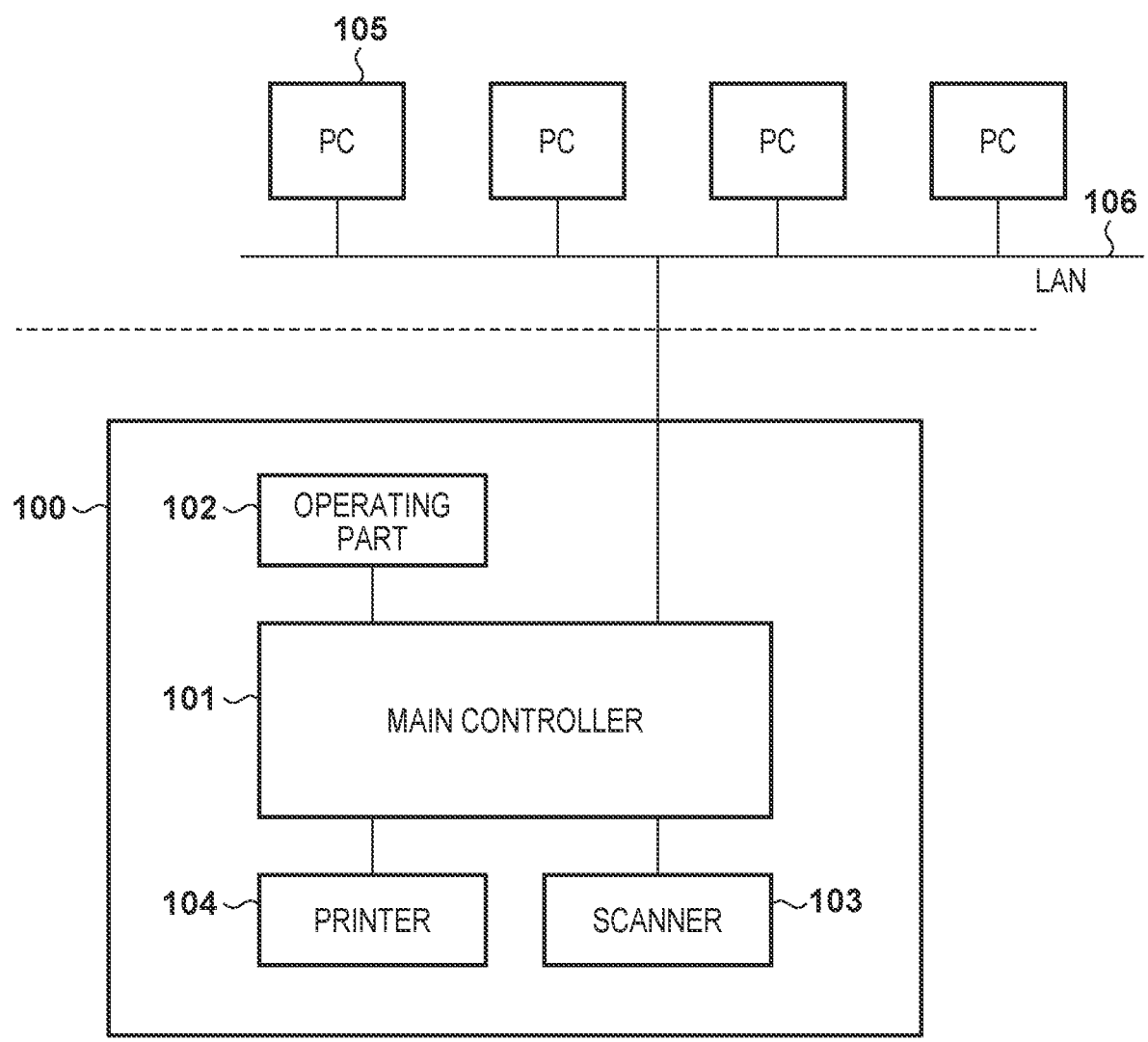
FIG. 1 is a block diagram showing a system configuration of an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. In the following embodiments, the same components are indicated by the same reference numerals to omit their description.

First Embodiment

Image Forming Apparatus

FIG. 1 is a block diagram showing a system configuration of an image forming apparatus which includes a semiconductor integrated circuit according to the present embodiment. An image forming apparatus 100 is an MFP (Multi Function Printer) having a variety of image processing functions such as image input and output, image transmission and reception, scanning, and printing. The image forming apparatus 100 includes a main controller 101, an operating part 102 as a user interface, a scanner 103 as an image input device, and a printer 104 as an image output device. The operating part 102, the scanner 103, and the printer 104 are independently connected to the main controller 101 and controlled by instructions from the main controller 101.

The main controller 101 is also connected to a wired or wireless LAN (Local Area Network) 106. PCs 105 are common PCs (Personal Computers) and communicate with the image forming apparatus 100 via the LAN 106. For example, when a user gives a print instruction in an application running on one of the PCs 105, a print job for the image forming apparatus 100 is transmitted from the PC 105 to the image forming apparatus 100.

Figure 2:
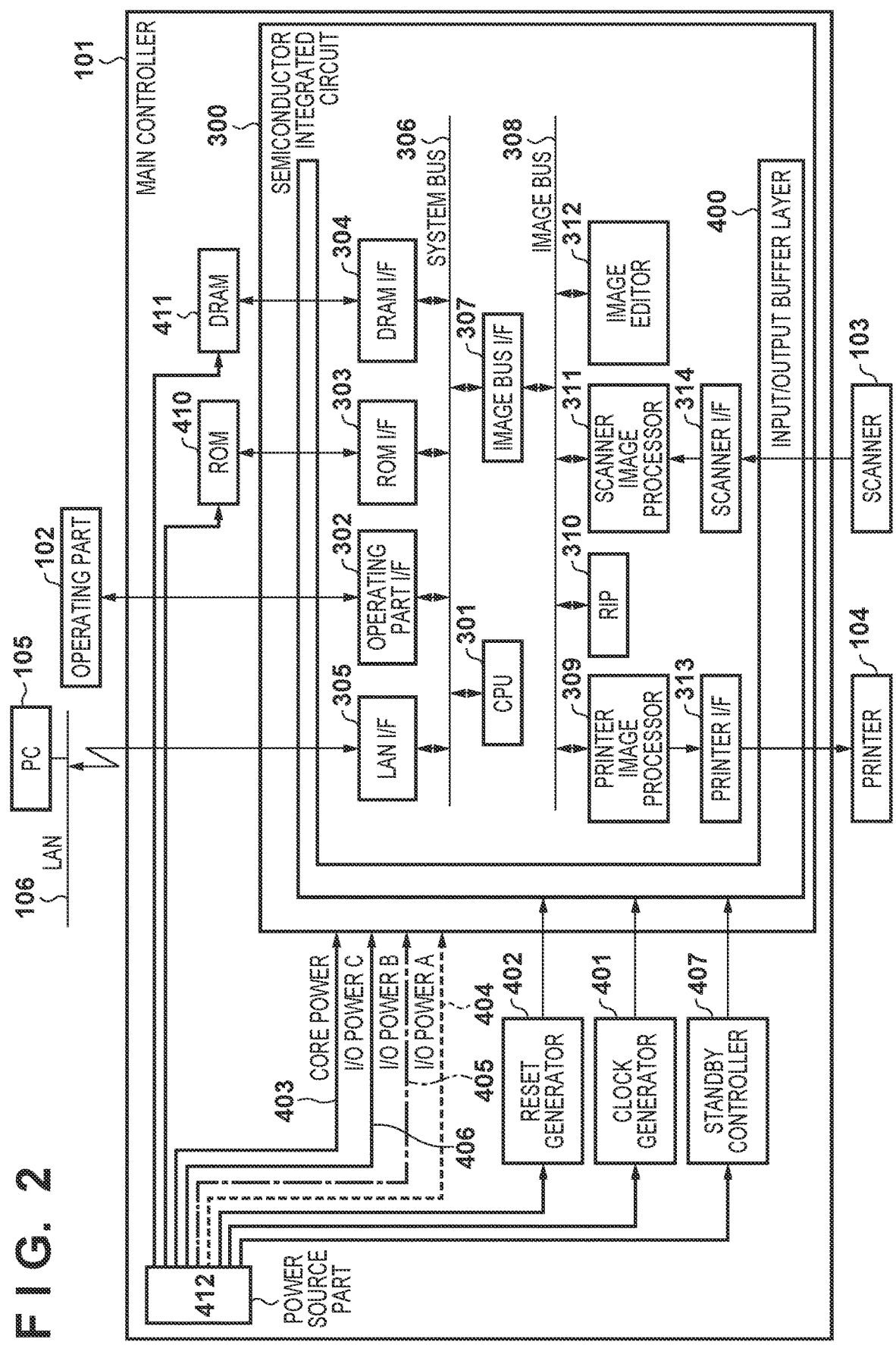
FIG. 2 shows a configuration of a main controller of the image forming apparatus.

FIG. 2 shows a configuration of the main controller 101 of the image forming apparatus 100. The main controller 101, having total control of the entire image forming apparatus 100, includes a semiconductor integrated circuit 300, controls the scanner 103 and the printer 104, and is connected to the LAN 106. The main controller 101 inputs and outputs image information, device information, files, and the like from and to external equipment via the LAN 106.

Regarding the main controller 101, various functional modules configured by digital logic circuits in the semiconductor integrated circuit 300, and devices connected to the semiconductor integrated circuit 300 are now described in detail. The semiconductor integrated circuit 300 has a CPU 301 as a main control part. The CPU 301 is connected, via a system bus 306, to a LAN I/F 305, an operating part I/F 302, a ROM I/F 303, a DRAM I/F 304, and an image bus I/F 307. The LAN I/F 305, being an interface for connection to the LAN 106, inputs and outputs information from and to the LAN 106. The operating part I/F 302 is an interface for an input operation from and an output operation to the operating part 102. The operating part I/F 302 serves to output image data for display to the operating part 102, and to transfer information entered by a user via the operating part 102 to the CPU 301.

A ROM 410 is a read-only memory which stores a boot program for system start-up, a predetermined execution program, and the like. The ROM 410 is connected to the semiconductor integrated circuit 300 via the ROM I/F 303. A DRAM 411 is a storage area, readable and writable as needed, for providing a work area as a working memory of the CPU 301. The DRAM 411 serves to store a temporary setting value of the image forming apparatus 100, information of a job to be executed, and the like. The DRAM I/F 304, being an interface for connection to the DRAM 411, has a memory controller for controlling the DRAM 411, and reads out data from and writes data to the DRAM 411.

The image bus I/F 307 is an interface which connects the system bus 306 with an image bus 308 for fast transfer of image data, and operates as a bus bridge which converts a data structure. The image bus 308 connects with a printer image processor 309, a printer I/F 313, an RIP (Raster Image Processor) 310, a scanner image processor 311, a scanner I/F 314, and an image editor 312.

The printer image processor 309 processes print output image data to be output to the printer 104 by color conversion, filtering, resolution conversion, or the like. The printer I/F 313, being an interface for connection between the printer 104 and the main controller 101, converts image data between synchronous data and asynchronous data. The RIP 310 receives PDL (Page Description Language) data which is transmitted, for example, from one of the PCs 105 as a print job via the LAN I/F 305, and decompresses the data to a bitmap image. The scanner I/F 314, being an interface for connection between the scanner 103 and the main controller 101, converts the data format of a scanned image or performs other similar processing. The scanner image processor 311 corrects, processes, edits, or otherwise treats the input image data read out from the scanner 103. The image editor 312 edits the image data, for example, by rotation of the image data.

A power source part 412 supplies DC power, generated from utility AC power (not shown), to the ROM 410, the DRAM 411, the semiconductor integrated circuit 300, a reset generator 402, a clock generator 401, and a standby controller 407. The power for the semiconductor integrated circuit 300 is composed of a core power 403, an I/O power A 404, an I/O power B 405, and an I/O power C 406, and is supplied based on a sequence to be described later.

The reset generator 402 controls a reset signal for the semiconductor integrated circuit 300, based on the sequence to be described later; the reset signal serves to reset digital logic circuits which constitute the above-mentioned various functional modules provided in the semiconductor integrated circuit 300. The clock generator 401 supplies a clock signal to the semiconductor integrated circuit 300, based on the sequence to be described later; the clock signal serves to activate synchronous circuits of the digital logic circuits in the semiconductor integrated circuit 300. The clock generator 401 may employ, for example, an oscillator or a crystal resonator. The standby controller 407 controls a standby control signal to the semiconductor integrated circuit 300, based on the sequence to be described later; the standby control signal serves to suppress an incorrect output from an output terminal in the semiconductor integrated circuit 300. An input/output buffer layer 400 contains a plurality of input/output buffers which exchange electric signals between the various devices on the main controller 101 and the digital logic circuits in the semiconductor integrated circuit 300 via external terminals (not shown) of the semiconductor integrated circuit 300.

I/O Voltage Setting for the Input/Output Buffer

Figure 3:
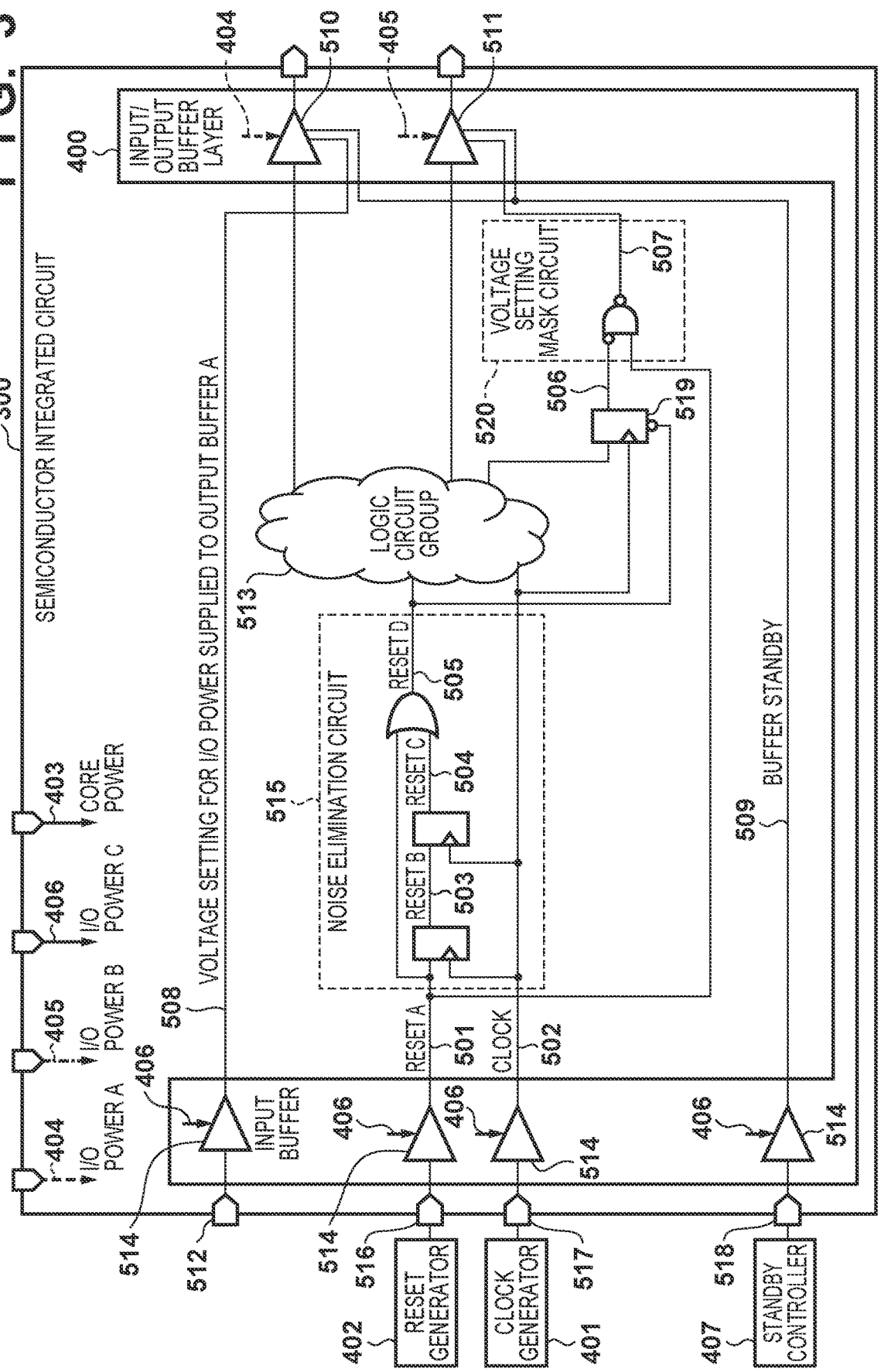
FIG. 3 shows a circuit configuration in a semiconductor integrated circuit.

FIG. 3 is a schematic diagram showing a circuit configuration in the semiconductor integrated circuit 300. The semiconductor integrated circuit 300 contains various digital logic circuits which constitute the above-mentioned various functional modules and the like, and in FIG. 3, these digital logic circuits are simply shown as a logic circuit group 513. The power for the semiconductor integrated circuit 300 is composed of the core power 403 for operating the internal digital logic circuits as well as the I/O power A 404, the I/O power B 405, and the I/O power C 406 for driving input/output buffers. The input/output buffer layer 400 contains a plurality of input/output buffers, of which FIG. 3 shows input buffers 514, an output buffer A 510, and an output buffer B 511, by way of example.

Each input buffer 514 serves to input an electric signal from a device connected to the semiconductor integrated circuit 300 on the main controller 101, and the power for the input buffers 514 is the I/O power C 406. The input buffers 514 convert the electric signal level of the I/O power C 406 to that of the core power 403, and send the converted electric signals to the digital logic circuits in the semiconductor integrated circuit 300.

A noise elimination circuit 515 is a logic circuit composed of two flip-flops and an OR gate. When short-time noise is applied for some cause to a reset signal A 501 which is supplied from the reset generator 402 via a reset input terminal 516 (reset input part), the noise elimination circuit 515 removes the noise so as to prevent transmission of the noise to the internal digital logic circuits. The logic circuit group 513 in this embodiment is a synchronous circuit which is operated by a clock signal 502 supplied from the clock generator 401 via a clock input terminal 517 (clock input part). The noise elimination circuit 515 removes noise from the reset signal A 501 which is controlled by the reset generator 402, and then outputs a denoised reset signal D 505, which resets the logic circuit group 513.

The output buffer A 510 serves to supply an electric signal to a device connected to the semiconductor integrated circuit 300 on the main controller 101, and the power for the output buffer A 510 is the I/O power A 404. The output buffer A 510 converts the electric signal level of the core power 403 supplied from the logic circuit group 513 to the electric signal level of the I/O power A 404, and sends the converted electric signal to an external device. The output buffer A 510 is selectively adaptable to more than one voltage level of the I/O power, by setting the voltage level of the I/O power A 404 to be supplied. Not only the output buffer A 510 but also any other buffer circuit(s) used in the input/output buffer layer 400 is/are adaptable to more than one supply voltage level of a drive power, by setting the drive voltage level of a drive power to be supplied. After the voltage level of the I/O power supplied to the output buffer A 510 is set, a threshold voltage for distinguishing a logical value between High and Low, and a withstand voltage related to the supplied I/O power A 404 are changed according to the set voltage level.

A process for setting the voltage level of the I/O power A 404 supplied to the output buffer A 510 is described next. For example, at a voltage setting terminal 512 for the I/O power supplied to the output buffer A 510, the logical value is fixedly set to High or Low by the main controller 101. Accordingly, a voltage setting signal 508 for the I/O power supplied to the output buffer A 510 is input to the output buffer A 510. The power source part 412 is configured to supply the I/O power A 404 at a voltage level corresponding to the voltage setting signal 508 for the I/O power supplied to the output buffer A 510. As exemplary settings in the present embodiment, when the source voltage supplied from the I/O power A 404 to the output buffer A 510 is 3.3 V, the output buffer A 510 adopts a high voltage setting and connects to an external device at a voltage level of 3.3 V. On the other hand, when the source voltage supplied from the I/O power A 404 to the output buffer A 510 is 1.8 V, the output buffer A 510 adopts a low voltage setting and connects an external device at a voltage level of 1.8 V. In addition, if the voltage setting signal 508 for the I/O power supplied to the output buffer A 510 is High, the output buffer A 510 adopts a high voltage setting of 3.3 V, whereas if the voltage setting signal 508 for the I/O power supplied to the output buffer A 510 is Low, the output buffer A 510 adopts a low voltage setting of 1.8 V.

In this regard, when the voltage setting signal 508 for the I/O power supplied to the output buffer A 510 is Low, the withstand voltage at the output buffer A 510 with respect to the I/O power A 404 decreases. If the I/O power A 404 is supplied at a high source voltage of 3.3V to this output buffer A 510, the output buffer A 510 receives a load over its withstand voltage. To avoid such overloading, the voltage level of the I/O power for the output buffer A 510, which is set by means of the voltage setting terminal 512 for the I/O power supplied to the output buffer A 510, needs to be set in advance to High or Low on the main controller in such a manner as to match the voltage level of the I/O power A 404. The voltage setting terminal 512 for the I/O power supplied to the output buffer A 510 is configured to set the voltage level of the I/O power to be supplied, by using an external terminal of the semiconductor integrated circuit 300. In this configuration, if the number of input/output buffers to be used at different voltage levels increases, more external terminals for setting the voltage levels are required correspondingly.

The output buffer B 511 is similar to the output buffer A 510, but the power for the output buffer B 511 is the I/O power B 405. The voltage level of the I/O power B 405 is set by a voltage setting signal B 507 for the I/O power supplied to the output buffer B 511, which is a signal produced by a setting circuit to which a setting value for the voltage setting signal A 506 for the I/O power supplied to the output buffer B 511 is supplied (i.e., a voltage setting mask circuit 520 in FIG. 3 to which an output of a flip-flop 519 is supplied). By using a flip-flop having a setting value for the voltage setting for the I/O power, it is not necessary to increase the number of external terminals for setting the voltage level of the supplied I/O power.

When the various power sources for the semiconductor integrated circuit 300 are turned on, the clock signal 502 does not oscillate immediately, so that the reset signal A 501, which is configured to pass through the noise elimination circuit 515, is not transmitted. Thus, the logic circuit group 513, and the flip-flop having the setting of the voltage setting signal A 506 for the I/O power supplied to the output buffer B 511 are not reset for a certain period after power-on, and during this period, the logical values of outputs from the logic circuit group 513 and the flip-flop are indeterminate between High and Low. While the output of the flip-flop having the setting of the voltage setting signal A 506 for the I/O power supplied to the output buffer B 511 is indeterminate, the withstand voltage at the output buffer B 511 may be lower than the voltage level of the supplied I/O power B 405. In this case, the output buffer B 511 may receive a load over its withstand voltage.

To prevent such a possibility, the voltage setting mask circuit 520 in the present embodiment constitutes a signal control circuit which masks the voltage setting signal A 506 for the I/O power supplied to the output buffer B 511 in such a manner as to set a high withstand voltage at the output buffer B 511. The voltage setting mask circuit 520 outputs, to the output buffer B 511, the thus masked setting as a setting value for the voltage setting signal B 507 for the I/O power supplied to the output buffer B 511. The voltage setting mask circuit 520 is a logic circuit which outputs the result of a NOT (negation) logic operation performed on the result of an AND (conjunction) logic operation performed on the reset signal A 501 and the result of a NOT logic operation performed on the voltage setting signal A 506 for the I/O power supplied to the output buffer B 511. Namely, while the reset signal A 501 is Low, the voltage setting signal B 507 for the I/O power supplied to the output buffer B 511 is always High, regardless of the logic level of the voltage setting signal A 506 for the I/O power supplied to the output buffer B 511. Consequently, at the output buffer B 511, the voltage of the I/O power can be set to ensure a high withstand voltage. On the other hand, while the reset signal A 501 is High, the logical value of the voltage setting signal A 506 for the I/O power supplied to the output buffer B 511 is equal to that of the voltage setting signal B 507 for the I/O power supplied to the output buffer B 511. Consequently, the voltage of the I/O power supplied to the output buffer B 511 can be set according to the setting of the voltage setting signal A 506 for the I/O power supplied to the output buffer B 511.

If outputs from the logic circuit group 513 are indeterminate, the output buffer A 510 and the output buffer B 511 which receive the outputs from the logic circuit group 513 may output incorrect values to external devices connected to the semiconductor integrated circuit 300. To avoid such a possibility, a buffer standby signal 509 is supplied as a control signal from the standby controller 407 via a buffer standby input terminal 518 to each of the output buffer A 510 and the output buffer B 511. An output of an output terminal is thus controlled to an output level which is predetermined for each output buffer. The output level which is predetermined for each output buffer is High level, Low level, or High-impedance state. The standby controller 407 can control the output level of an output terminal to an output level which is predetermined for each output buffer, at a freely selected timing, by controlling the buffer standby signal 509 which serves as a control signal.

Although the input buffers 514, the output buffer A 510, and the output buffer B 511 are illustrated in FIG. 3, there is no limitation to these input/output buffers. For example, the configuration of the present embodiment is similarly applicable to any other input/output buffer(s) (not shown) for communication between the semiconductor integrated circuit 300 and one or more external devices. Further, the present embodiment should not be limited to the above-described configuration wherein each output buffer is provided with one I/O power, and one voltage setting terminal for the I/O power or one flip-flop for setting the voltage of the I/O power. For example, the present embodiment may be configured such that a plurality of output buffers share one I/O power, one flip-flop for setting the voltage of the I/O power, and the like.

Timing Diagram at Power-on

Figure 4:
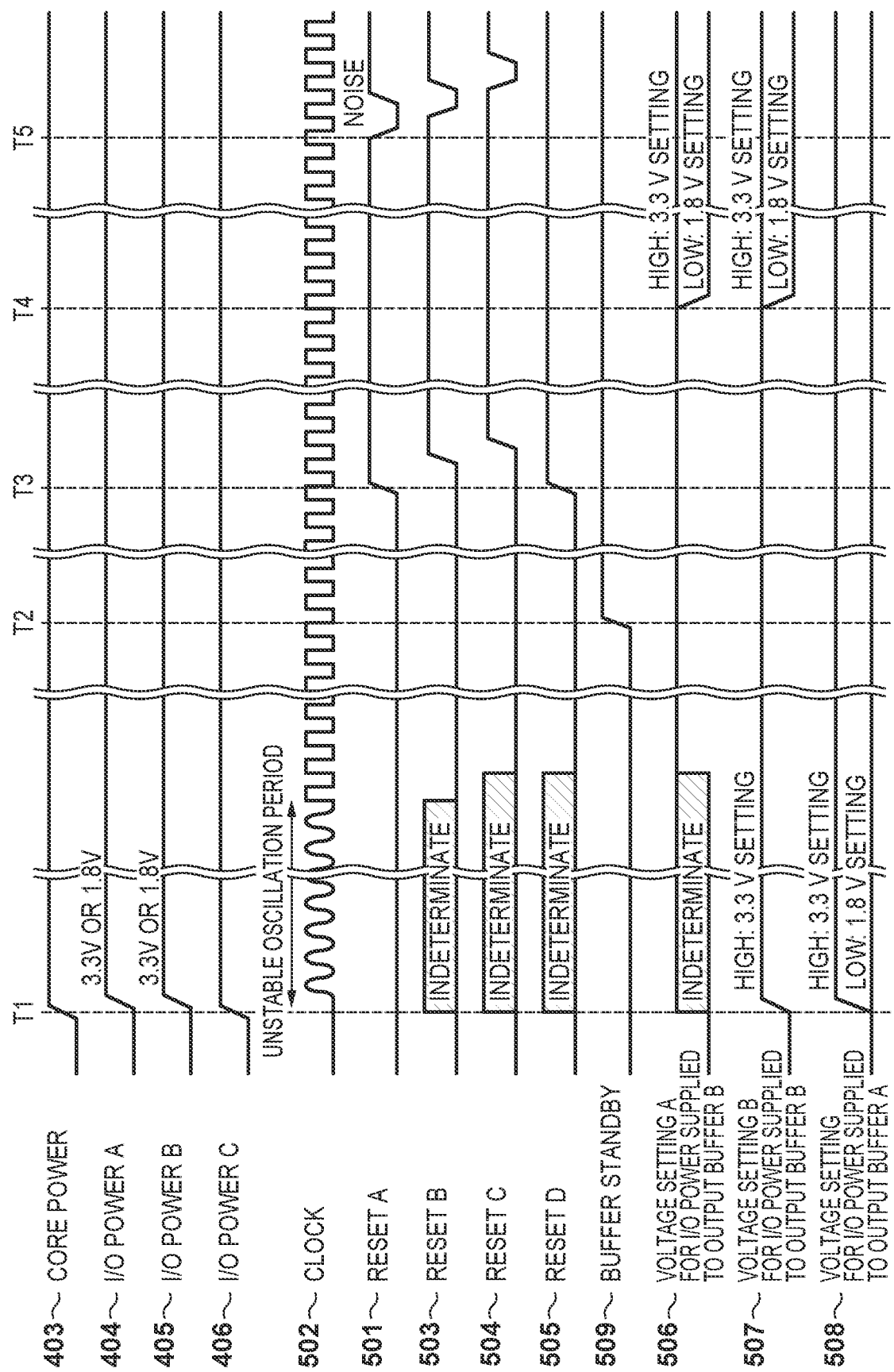
FIG. 4 is a timing diagram showing changes in levels of relevant electric signals.

FIG. 4 is a timing diagram showing changes in levels of relevant electric signals, in a sequence of turning on various power sources for the semiconductor integrated circuit 300 on the main controller 101 and allowing the semiconductor integrated circuit 300 to start operation. Circuit operations in the above-mentioned semiconductor integrated circuit 300 are described below with reference to FIG. 4.

First, at Time T1, the power source part 412 starts to supply the core power 403 and the I/O power C 406, and a little later supplies the I/O power A 404 and the I/O power B 405. The preceding supply of the core power 403 and the I/O power C 406 can determine the voltage level setting for the I/O powers for the output buffers A 510 and the output buffer B 511, and allows the supply of the I/O power A 404 and the I/O power B 405 after the voltage level setting has been determined. Immediately after the semiconductor integrated circuit 300 is powered on (after start-up), oscillation of the clock signal 502 is unstable for a certain period. During this period, operation of the digital logic circuits in the semiconductor integrated circuit 300 cannot be guaranteed.

The reset signal A 501 resets the digital logic circuits in the semiconductor integrated circuit 300 when the signal is Low. While oscillation of the clock signal 502 is unstable, operation of the noise elimination circuit 515 is not guaranteed, and a reset signal B 503, a reset signal C 504, and the reset signal D 505 are indeterminate for a certain period. When oscillation of the clock signal 502 has stabilized, the reset signal D 505 which comes through the noise elimination circuit 515 enables resetting of the circuits. Resetting of the logic circuit group 513 and the flip-flop having the setting of the voltage setting signal A 506 for the I/O power supplied to the output buffer B 511 solves the indeterminate state, and determines output levels of the logic circuit group 513 and the flip-flop.

When the flip-flop having the setting of the voltage setting signal A 506 for the I/O power supplied to the output buffer B 511 is reset, the initial output value of the flip-flop is High. This output value gives a high voltage setting of 3.3 V to the output buffer B 511 as the voltage setting for the I/O power, and thus ensures a high withstand voltage at the output buffer B 511. Regardless of whether the I/O power B 405 supplied to the output buffer B 511 is at a high voltage of 3.3 V or a low voltage of 1.8 V, this setting can protect the output buffer B 511 from a load over its withstand voltage.

The buffer standby signal 509 controls outputs from the output buffer A 510 and the output buffer B 511 when the level of the buffer standby signal 509 is Low. To suppress incorrect outputs from these output buffers, the buffer standby signal 509 remains Low until Time T2 at which the unstable oscillation period of the clock signal has ended and oscillation of the clock signal has stabilized sufficiently.

At Time T1, the flip-flop having the setting of the voltage setting signal A 506 for the I/O power supplied to the output buffer B 511 is not reset, and the value of the voltage setting signal A 506 for the I/O power supplied to the output buffer B 511 is indeterminate. The voltage setting signal B 507 for the I/O power supplied to the output buffer B 511 is fixed at High, by an output from the voltage setting mask circuit 520 based on the reset signal A 501. This signal gives a high voltage setting of 3.3 V to the output buffer B 511 as the voltage setting for the I/O power, and thus ensures a high withstand voltage.

If the I/O power A 404 supplied to the output buffer A 510 is at a high voltage of 3.3 V, the voltage setting terminal 512 for the I/O power supplied to the output buffer A 510 receives a High signal corresponding to the voltage level of the supplied I/O power A 404. Accordingly, at the output buffer A 510, the voltage setting signal 508 for the I/O power supplied to the output buffer A 510 sets the voltage of the I/O power to a high withstand voltage. On the other hand, if the I/O power A 404 supplied to the output buffer A 510 is at a low voltage of 1.8 V, the voltage setting terminal 512 for the I/O power supplied to the output buffer A 510 receives a Low signal corresponding to the voltage level of the supplied I/O power A 404. Accordingly, at the output buffer A 510, the voltage setting signal 508 for the I/O power supplied to the output buffer A 510 sets the voltage of the I/O power to a low withstand voltage.

At Time T2, the buffer standby signal 509 changes to High, and the Low signal state is cleared, and at Time T3, the reset signal A 501 changes to High, and the Low signal state is cleared. When the reset signal A 501 changes to High and the Low signal state is cleared, the reset signal D 505 also changes to High and the Low signal state is cleared. These signal changes enable operation of the logic circuit group 513 and operation of the flip-flop having the setting of the voltage setting signal A 506 for the I/O power supplied to the output buffer B 511, and then, the various functional modules in the semiconductor integrated circuit 300 start to operate.

At Time T4, if the voltage level of the I/O power B 405 supplied to the output buffer B 511 is 1.8 V, the threshold voltage for distinguishing a logical value between High and Low needs to be set properly. Hence, the output value of the flip-flop having the setting of the voltage setting signal A 506 for the I/O power supplied to the output buffer B 511 is set to Low.

On the other hand, if the voltage level of the I/O power B 405 supplied to the output buffer B 511 is 3.3 V, the output value of the flip-flop having the setting of the voltage setting signal A 506 for the I/O power supplied to the output buffer B 511 is kept at the initial value, i.e., High. At this stage, the setting value of the voltage setting signal A 506 for the I/O power supplied to the output buffer B 511 is equal to the setting value of the voltage setting signal B 507 for the I/O power supplied to the output buffer B 511, according to which the voltage of the I/O power supplied to the output buffer B 511 can be set.

At Time T5, even if noise is applied to the reset signal A 501 for some cause, noise shorter than one cycle of the clock signal 502 is removed by the noise elimination circuit 515 and is not transmitted to the reset signal D 505. This configuration can prevent unintended reset of the logic circuit group 513 and the like.

Flow at Power-on

FIG. 5 is a flowchart showing an operation sequence when the semiconductor integrated circuit 300 is powered on. The operation sequence when the semiconductor integrated circuit 300 is powered on starts with supply control of various powers, reset control, clock supply control, and buffer standby control. The power source part 412 on the main controller 101 performs the supply control of various powers. The reset generator 402 performs the reset control. The clock generator 401 performs the clock supply control. The standby controller 407 performs the buffer standby control.

First, in step S501, which corresponds to Time T1 in FIG. 4, the power source part 412 supplies the core power 403 and the I/O power C 406 to the semiconductor integrated circuit 300. Next, in step S502, which corresponds to a moment immediately after Time T1 in FIG. 4, the power source part 412 supplies the I/O power A 404 and the I/O power B 405 to the semiconductor integrated circuit 300. At this moment, the reset generator 402 sends a Low reset signal A 501 and the standby controller 407 sends a Low buffer standby signal 509 to the semiconductor integrated circuit 300, as shown in FIG. 4. The clock generator 401 starts oscillation of the clock signal 502.

In step S503, which corresponds to Time T2 in FIG. 4, oscillation of the clock signal 502 has stabilized, and the output values of the output buffer A 510 and the output buffer B 511 have been determined, and hence, the standby controller 407 changes the buffer standby signal 509 from Low to High. In step S504, which corresponds to Time T3 in FIG. 4, the reset generator 402 changes the reset signal A 501 from Low to High, which in turn changes the reset signal D 505 from Low to High and allows the digital logic circuits in the semiconductor integrated circuit 300 to start operation.

In this step, the CPU 301 reads out and decompress a boot program from the ROM 410, and provides a decompressed program to the DRAM 411 to initiate system start-up. The boot program sets a setting value of the voltage setting signal A 506 for the I/O power supplied to the output buffer B 511 in such a manner as to match the I/O source voltage supplied from the I/O power B 405. Namely, the setting value of the voltage setting signal A 506 is High when the voltage of the I/O power is 3.3 V, and the setting value is Low when the voltage of the I/O power is 1.8 V.

In step S505, which corresponds to Time T4 in FIG. 4, a setting value which is preset in the boot program stored in the ROM 410 is set, by the CPU 301, at the flip-flop having the setting value of the voltage setting signal A 506 for the I/O power supplied to the output buffer B 511. The process shown in FIG. 5 ends with this step.

As mentioned earlier, use of the noise elimination circuit for removing the noise applied to a reset signal causes a setting value of the voltage level of each I/O power to be indeterminate when the semiconductor integrated circuit is powered on, and even in this case, the above-described configuration can set the voltage at each of the input/output buffers so as to ensure a high withstand voltage. This enables protecting each of the input/output buffers from a load over its respective withstand voltage.

In order to fix the voltage setting signal B 507 for the I/O power supplied to the output buffer B 511 at High, the present embodiment uses a low active signal as a mask signal in the voltage setting mask circuit 520. In other words, the mask signal needs to be low active after the start-up of the semiconductor integrated circuit 300 until the stabilization of the clock signal. As long as the voltage setting signal B 507 for the I/O power supplied to the output buffer B 511 is fixed High by such a mask signal, the logic circuit is not limited to the voltage setting mask circuit 520 shown in FIG. 3, but may be a logic circuit having a different configuration. Additionally, as long as the voltage setting signal B 507 for the I/O power supplied to the output buffer B 511 is fixed High after the start-up of the semiconductor integrated circuit 300 until the stabilization of the clock signal, the mask signal may not necessarily be a low active signal.

As another alternative configuration, the semiconductor integrated circuit 300 may be composed of an FPGA, in which a configuration memory stores a plurality of programs describing a plurality of types of logic circuits for the voltage setting mask circuit 520 which respectively correspond to a plurality of types of mask signals. In this configuration, a logic circuit for the voltage setting mask circuit 520 may be constructed by execution of a program which describes a logic corresponding to a mask signal to be used. For example, the ROM 410 may serve as the configuration memory.

In the present embodiment, the target to mask is the voltage setting for the I/O power supplied to the output buffer B 511, which is merely an example, and the target to mask should not be limited to the voltage setting for the I/O power supplied to the output buffer B 511, but may be the voltage setting for an I/O power supplied, for example, to an input buffer which allows a variable voltage setting for the I/O power.

Second Embodiment

Second Embodiment is described by focusing on the points different from First Embodiment. In the present embodiment, the input signal supplied to the voltage setting mask circuit is not a reset signal, but rather a buffer standby signal. Such use of the buffer standby signal similarly enables suppression control of an incorrect output from each output buffer, and protects the input/output buffers by setting the voltage of the I/O powers so as to have a high withstand voltage, but independently of the timing of the reset signal controlled by the reset controller.

FIG. 6 shows a circuit configuration in the semiconductor integrated circuit 300 provided in the image forming apparatus 100 according to the present embodiment. In the present embodiment, input signals supplied to the voltage setting mask circuit 520 are the voltage setting signal A 506 for the I/O power supplied to the output buffer B 511 and the buffer standby signal 509. This voltage setting mask circuit 520 is a logic circuit which outputs the result of a NOT logic operation performed on an AND logic operation performed on the buffer standby signal 509 and the result of a NOT logic operation performed on the voltage setting signal A 506 for the I/O power supplied to the output buffer B 511.

While the buffer standby signal 509 is Low, the voltage setting signal B 507 for the I/O power supplied to the output buffer B 511 is always High, regardless of the logic level of the voltage setting signal A 506 for the I/O power supplied to the output buffer B 511. Consequently, at the output buffer B 511, the voltage of the I/O power can be set to ensure a high withstand voltage. On the other hand, while the buffer standby signal 509 is High, the logical value of the voltage setting signal A 506 for the I/O power supplied to the output buffer B 511 is equal to that of the voltage setting signal B 507 for the I/O power supplied to the output buffer B 511. In other words, the voltage of the I/O power supplied to the output buffer B 511 can be set according to the setting of the voltage setting signal A 506 for the I/O power supplied to the output buffer B 511. While the buffer standby signal 509 is Low and suppresses an incorrect output from the output buffer B 511, the voltage setting mask circuit 520 masks the voltage setting signal A 506 for the I/O power supplied to the output buffer B 511 so as to ensure a high withstand voltage at the output buffer B 511. As a result, the masked voltage setting signal B 507 for the I/O power supplied to the output buffer B 511 is output to the output buffer B 511.

The present embodiment also uses the sequence of turning on various powers for the semiconductor integrated circuit 300 and allowing the semiconductor integrated circuit 300 to start operation, and regarding the timing diagram which shows changes in levels of relevant electric signals in this sequence, the description with reference to FIG. 4 is similarly applicable to this embodiment. Regarding the flowchart which shows the operation sequence when the semiconductor integrated circuit 300 is powered on, the description with reference to FIG. 5 is similarly applicable to this embodiment.

As mentioned earlier, use of the noise elimination circuit for removing the noise applied to a reset signal causes a setting value of the voltage level of each I/O power to be indeterminate when the semiconductor integrated circuit is powered on, and even in this case, the above-described configuration can set the voltage at each of the input/output buffers so as to ensure a high withstand voltage. Accordingly, it is possible to protect each of the input/output buffers from a load over its respective withstand voltage.

In order to keep the voltage setting signal B 507 for the I/O power supplied to the output buffer B 511 at a High level, the present embodiment also uses a low active signal as a mask signal in the voltage setting mask circuit 520. The mask signal in First Embodiment is the reset signal A 501, whereas the mask signal in the present embodiment is the buffer standby signal 509.

Similarly to First Embodiment, the semiconductor integrated circuit 300 may be composed of an FPGA, in which a configuration memory stores a plurality of programs describing a plurality of types of logic circuits for the voltage setting mask circuit 520 which respectively correspond to a plurality of types of mask signals. In this configuration, a logic circuit for the voltage setting mask circuit 520 may be constructed by execution of a program which describes a logic corresponding to a mask signal to be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-185318, filed Sep. 26, 2017, which is hereby incorporated by reference herein in its entirety.

What is claimed is:

1. An information processing apparatus comprising:
   a first circuit configured to operate by receiving a first voltage or a second voltage higher than the first voltage;
   a second circuit configured to output a signal indicating which of the first voltage or the second voltage is to be supplied to the first circuit; and
   a control unit configured to receive the signal output by the second circuit and to output, to the first circuit, a signal indicating a voltage to be supplied to the first circuit,
   wherein the control unit is configured to output a signal indicating the second voltage for a period until when the signal output by the second circuit has stabilized, and to output a signal indicating a voltage as indicated by the signal received from the second circuit, after the signal output by the second circuit has stabilized.

2. The information processing apparatus according to claim 1, further comprising
   a clock output unit configured to output a clock signal,
   wherein the clock signal output by the clock output unit is input to the second circuit.

3. The information processing apparatus according to claim 2,
   wherein the period until when the signal output by the second circuit has stabilized includes a period until when the clock signal output by the clock output unit has stabilized.

4. The information processing apparatus according to claim 1, further comprising;
   a reset output unit configured to output a reset signal; and
   a noise elimination unit configured to remove noise in the reset signal output by the reset output unit,
   wherein a reset signal from which the noise has been removed by the noise elimination unit is input to the second circuit.

5. The information processing apparatus according to claim 4, wherein the reset signal output by the reset output unit is input to the control unit.

6. The information processing apparatus according to claim 5, wherein the reset output unit stops outputting the reset signal after the signal ouput by the second circuit has stabilized.

7. The information processing apparatus according to claim 5, wherein the reset signal input to the control unit is a reset signal from which noise is not removed by the noise elimination unit.

8. The information processing apparatus according to claim 1, further comprising a power source part which supplies the first circuit with electric power at the first voltage or the second voltage.

9. The information processing apparatus according to claim 1, wherein the control unit outputs the signal indicating the second voltage for the period until when the signal output by the second circuit has stabilized, regardless of whether the signal received from the second circuit indicates the first voltage or the second voltage.

10. The information processing apparatus according to claim 1, wherein the signal output by the control unit is input to the first circuit, and the first circuit sets the voltage to be input to the first circuit, based on the signal output by the control unit.

11. The information processing apparatus according to claim 10, wherein the first circuit outputs a signal indicating the voltage which was set by the signal received from the control unit.

12. The information processing apparatus according to claim 10, further comprising an output control unit configured to control an output from the first circuit, wherein the output control unit is configured to prevent the first circuit from outputting a signal for the period until when the signal output by the second circuit has stabilized, and to enable the first circuit to output a signal after the signal output by the second circuit has stabilized.

13. The information processing apparatus according to claim 12, wherein a signal output by the output control unit is input to the control unit.

14. The information processing apparatus according to claim 1, further comprising at least one of a reading unit which reads an original and a print unit which prints an image on a sheet.

15. The information processing apparatus according to claim 1, wherein the control unit is a logic circuit.

* * * * *